(12) United States Patent
Troegel et al.

(10) Patent No.: US 11,145,849 B2
(45) Date of Patent: Oct. 12, 2021

(54) PRODUCTION OF SI/C COMPOSITE PARTICLES

(71) Applicant: WACKER CHEMIE AG, Munich (DE)

(72) Inventors: Dennis Troegel, Ottensiis (DE); Jelena Pantelic-Seidl, Germering (DE)

(73) Assignee: WACKER CHEMIE AG, Munich (DE)

( * ) Notice: Subject to any disclaimer, the term of this patent is extended or adjusted under 35 U.S.C. 154(b) by 49 days.

(21) Appl. No.: 16/081,239

(22) PCT Filed: Feb. 27, 2017

(86) PCT No.: PCT/EP2017/054525
§ 371 (c)(1),
(2) Date: Aug. 30, 2018

(87) PCT Pub. No.: WO2017/148871
PCT Pub. Date: Sep. 8, 2017

(65) Prior Publication Data
US 2019/0074506 A1    Mar. 7, 2019

(30) Foreign Application Priority Data

Mar. 1, 2016 (DE) .................... 10 2016 203 349.2

(51) Int. Cl.
*H01M 4/133* (2010.01)
*H01M 4/134* (2010.01)
(Continued)

(52) U.S. Cl.
CPC ........... *H01M 4/133* (2013.01); *H01M 4/134* (2013.01); *H01M 4/364* (2013.01); *H01M 4/386* (2013.01);
(Continued)

(58) Field of Classification Search
CPC ...... H01M 4/133; H01M 4/134; H01M 4/364; H01M 4/587; H01M 10/052; H01M 10/0525; H01M 4/386
(Continued)

(56) References Cited

U.S. PATENT DOCUMENTS

2007/0281216 A1    12/2007  Petrat et al.
2010/0176337 A1*   7/2010  Zhamu ................ H01M 4/1395
                                                                    252/182.1
(Continued)

FOREIGN PATENT DOCUMENTS

CN    102723469 A    10/2012
CN    103311522 A     9/2013
(Continued)

OTHER PUBLICATIONS

Machine Translation of CN 103560234 A by Liu Xiang "Composite graphite-silicon lithium ion battery cathode material and preparation method thereof" (Year: 2014).*
(Continued)

*Primary Examiner* — Victoria H Lynch
(74) *Attorney, Agent, or Firm* — Brooks Kushman P.C.

(57) ABSTRACT

The invention relates to methods for producing Si/C composite particles, characterised in that mixtures containing silicon particles, one or more oxygen-free polymers, one or more carbon additives based on a carbon modification and one or more liquid dispersing agents are dried by spray drying and the pre-composite particles thus obtained are thermally treated.

11 Claims, 5 Drawing Sheets

(51) Int. Cl.
H01M 4/36 (2006.01)
H01M 4/38 (2006.01)
H01M 4/587 (2010.01)
H01M 10/052 (2010.01)
H01M 10/0525 (2010.01)

(52) U.S. Cl.
CPC ......... *H01M 4/587* (2013.01); *H01M 10/052* (2013.01); *H01M 10/0525* (2013.01)

(58) Field of Classification Search
USPC .......................................................... 429/231
See application file for complete search history.

(56) References Cited

U.S. PATENT DOCUMENTS

| | | | |
|---|---|---|---|
| 2011/0165468 A1 | 7/2011 | Alias et al. | |
| 2014/0023928 A1* | 1/2014 | Jeon | H01M 4/364 429/220 |
| 2014/0147751 A1* | 5/2014 | Yang | H01M 4/1395 429/231.8 |
| 2014/0154576 A1* | 6/2014 | Kang | H01M 10/0569 429/222 |
| 2016/0359162 A1* | 12/2016 | Kim | H01M 4/0471 |
| 2017/0200941 A1 | 7/2017 | Yuge | |

FOREIGN PATENT DOCUMENTS

| | | |
|---|---|---|
| CN | 103560234 A | 2/2014 |
| EP | 1730800 B1 | 5/2008 |
| JP | 64043531 A2 | 2/1989 |
| JP | 1301717 A2 | 12/1989 |
| JP | 2012043547 A | 3/2012 |
| JP | 2014029833 A2 | 2/2014 |
| JP | 2014507050 A | 3/2014 |
| KR | 20150063620 A | 6/2015 |
| WO | WO2008069633 A1 | 6/2008 |
| WO | WO2014015139 A1 | 1/2014 |
| WO | 14205210 A1 | 12/2014 |
| WO | 15186742 A1 | 12/2015 |

OTHER PUBLICATIONS

Machine Translation CN103311522(A) (Year: 2013).*
Kasavajjula et al, "Nano- and bulk-silicon-based insertion anodes for lithium-ion secondary cells," ScienceDirect in Journal of Power Sources 2007, 163, pp. 1003 to 1039.
Terranova et al., "Si/C hybrid nanostructures for Li-ion anodes: An Overview," ScienceDirect, Journal of Power Sources 2014, 246, pp. 167 to 177.
Li, Min et al., "Facilie spray-drying/pyrolysis synthesis of core-shell structure graphite/silicon-porous carbon composite as a superior anode for Li-ion batteries" in Journal of Power Sources, 248 (2014) 721-728.
Bequin, Francois et al., "Si/C composites prepared by spray drying from cross-linked polyvinyl alcohol as Li-ion batteries anodes," in Electrochimica Acta 2015, 174, pp. 361-368.
Cui, Hongmin et al., "Nano/micro-structured silicon@carbon composite with buffer void as anode material for lithium ion battery," ScieneDirect, in Ceramics Int. 2015 (in press).
Su, Fabing, "Preparation of porous silicon/carbon microspheres as high performance anode materials for lithium ion batteries," (J. Mater Chem. A, 2015, 3, pp. 5859 to 5865).
Su, Fabing, "Scalable synthesis of porous silicon/carbon microspheres as improved anode materials for Li-ion batteries," (RSC Adv. 2014, 4, pp. 43114 to 43120).
Yang, Jun, "Porous microsperical silicon composite anode material for lithium ion battery," (Electrochimica Acta 2015, 178, pp. 65 to 73).
Li, Shuo et al., "Silicon/carbon composite microspheres with hierarchical core-shell structure as anode for lithium ion batteries," Electrochemistry Communications 49 (2014) 98-102.

* cited by examiner

PRODUCTION OF SI/C COMPOSITE PARTICLES

CROSS-REFERENCE TO RELATED APPLICATIONS

This application is a U.S. National Phase Application of PCT/EP2017/054525, filed Feb. 27, 2017, which claims priority to German Application No. 10 2016 203 349.2 filed on Mar. 1, 2016 the contents of which are incorporated herein by reference in their entireties for all purposes.

FIELD OF THE INVENTION

The invention relates to a method for producing precomposite particles by means of spray drying of compositions comprising polymers and silicon particles, to precomposite particles thus obtainable, to a method for producing Si/C composite particles by thermally treating the precomposite particles, to Si/C composite particles thus obtainable, and to the use thereof in electrode materials for lithium-ion batteries, more particularly for producing the negative electrodes of lithium-ion batteries.

BACKGROUND OF THE INVENTION

Rechargeable lithium-ion batteries are currently the electrochemical energy stores available commercially that have the highest energy densities, of up to 250 Wh/kg. They are utilized first and foremost in the area of portable electronics, for tools, and also for means of transport, such as bikes or automobiles, for example. Particularly for application in automobiles, however, it is necessary to achieve further significant increases in the energy density of the batteries, so as to extend the ranges of the vehicles.

Used presently as negative electrode material ("anode") in practice, first and foremost, is graphitic carbon. Graphitic carbon is notable for its stable cycle qualities and its decidedly high handling reliability by comparison with lithium metal, which is used in lithium primary cells. During incorporation and release of lithium, graphitic carbon undergoes only slight changes in volume—in the region of 10%, for example, for the limiting stoichiometry of $LiC_6$. A disadvantage, however, is its relatively low electrochemical capacity of theoretically 372 mAh/g, which corresponds to only about one tenth of the electrochemical capacity attainable theoretically using lithium metal.

Conversely, silicon, at 4199 mAh/g, possesses the highest known storage capacity for lithium ions. Disadvantageously, silicon-containing electrode active materials suffer from extreme changes in volume during charging and discharging with lithium, of up to around 300%. This change in volume places a severe mechanical stress on the active material and on the electrode structure as a whole, and this stress, through electrochemical milling, leads to loss of the electrical contacting and hence to the destruction of the electrode, with loss of capacity. Moreover, the surface of the silicon anode material used reacts with constituents of the electrolyte to form, continuously, passivating protective layers (Solid Electrolyte Interface; SEI), resulting in an irreversible loss of mobile lithium.

In order to resolve the problems associated with the severe volume expansion of the active material and the formation of SEI in Si-containing anodes, a variety of approaches have been pursued in recent years to the electrochemical stabilization of Si-containing electrode active materials, as described for example by A. J. Appleby in J. Power Sources 2007, 163, pages 1003 to 1039. In many cases, silicon-containing active material is employed in combination with carbon. In one approach, the Si-containing active material in the form of a physical mixture with graphite is to be inserted into the electrode coating, as taught in EP 1730800 B1. In another approach, the two elements silicon and carbon are combined structurally to form a composite material, as summarized in an overview article by M. Rossi in J. Power Sources 2014, 246, pages 167 to 177.

One commonplace method for producing spherical, micro-scale carbon particles is that of spray drying. In this case, solutions or dispersions of carbon precursors (C precursor), such as sugars, lignin, polyvinyl alcohols, polyalkylene oxides or resorcinol-formaldehyde resin, are sprayed to form droplets and then dried to form particles, the size and shape of which conforms to the size and shape of the droplets sprayed. The resultant dried, spherical C precursor particles can be converted by subsequent carbonization into particles of amorphous carbon. Hence JP 1301717 and JP 64043531 describe the production of polyacrylonitrile microspheres by means of spray drying, with the admixing of alcohol, as a nonsolvent for polyacrylonitrile, before or during the spraying process. WO-A 08069633 teaches the spray drying of carbon precursors in the presence of surface-active additives. Known from CN 102723469 is the spray drying of mixtures comprising polymer resin, such as phenolic resin, and graphite.

Other approaches carry out the spray drying using dispersions which include C precursors and silicon nanoparticles. Carbonization of resultant precomposite particles leads to Si/C composite particles, as described for example in US 2011165468 or by B. Li in Electrochem. Comm. 2014, 49, pages 98 to 102. F. Béguin, in Electrochimica Acta 2015, 174, pages 361 to 368, describes corresponding methods using polyvinyl alcohol as C precursor. H. Cui, in Ceramics Int. 2015 (in press), describes the production of porous Si/C composites by the spraying of $SiO_2$-coated silicon nanoparticles together with phenolic resin and their subsequent carbonization to form Si/C composite particles. To conclude, the $SiO_2$ coating is etched out using hydrofluoric acid.

Finally, there are also known approaches using dispersions for spray drying that comprise carbon-containing additives, oxygen-rich C precursors, and nanosilicon. Subsequent carbonization then gives Si/C composite particles. Thus F. Su (J. Mater Chem. A, 2015, 3, pages 5859 to 5865) describes the spray drying of graphitized needle coke together with nanosilicon and sucrose, and subsequent carbonization. F. Su (RSC Adv. 2014, 4, pages 43114 to 43120) describes a similar approach using conductive carbon black, nanosilicon, and sucrose. Y. Yang (Electrochimica Acta 2015, 178, pages 65 to 73) employs for this purpose carbon nanotubes, nanosilicon, and phenol-formaldehyde resin. X. Hou (J. Power Sources 2014, 248, pages 721 to 728) describes a two-stage method for producing Si/C composites, in which first nanosilicon is spray dried together with graphite and with citric acid as C precursor. The products of drying, after treatment at temperature, were coated with pitch, then subjected to spray drying and, lastly, to pyrolysis.

There continue, however, to be problems involved in producing—by spray drying of polymers and dispersions containing silicon particles—particles which, after pyrolysis, lead to suitable Si/C composite particles for electrode materials of lithium-ion batteries and which in particular have the particle sizes, and also very narrow particle size distributions, that are desired for this purpose. A desire in particular is for the primary particles present in dispersion to be converted by spray drying into corresponding particulate solids and converted subsequently by carbonization into corresponding Si/C composite particles, without the spray drying or the carbonization being accompanied by aggregation of particles, in other words by coalescence of different primary particles. As far as possible, therefore, each droplet produced during spraying is to be converted during drying into a separate particle. With conventional spray drying processes, there is considerable aggregation of primary particles, leading to dried particles having correspondingly large diameters and broad particle size distributions. If conventional spray drying products are carbonized, there may be sintering of particles in the process, and so in this step as well there may be unwanted particle aggregation, resulting in formation of large particles having customarily broad particle size distributions. Particles with unwanted size, i.e., disruptive oversize or undersize, can indeed by separated off by sieving or classifying. An additional operation of this kind, however, is costly and inconvenient, and also results in waste material. If used in lithium-ion batteries, large-diameter Si/C composite particles can be fatal, since such particles may exceed the layer thickness of anode material in the batteries and so may puncture the electrode or the separator in the battery, resulting in short-circuiting of the battery and hence terminating the functionality of the battery. This problem is exacerbated by the extreme volume expansions experienced by the silicon, present in the particles, during the charging cycles, with a consequent extreme increase in the volume of large particles. Overall, all of the problems associated with so-called electrochemical milling are more pronounced as a result of Si/C composite particles with larger particles.

BRIEF SUMMARY OF THE INVENTION

Against this background, the object was to provide unaggregated or minimally aggregated precomposite particles with which, through thermal treatment or carbonization, it is possible to access unaggregated or minimally aggregated Si-/C composite particles. Costly and inconvenient removal of oversize or undersize ought to be avoided as far as possible.

This object has surprisingly been achieved by the spray drying of mixtures comprising oxygen-free polymers, carbon-containing additives, and silicon particles, and by the conversion of the resultant precomposite particles, through subsequent thermal treatment, into Si/C composite particles. Through the combination of features in accordance with the invention, Si/C composite particles have been made accessible that have the particle diameters and particle size distributions desired for lithium-ion batteries. Unexpectedly, with the Si/C composite particles of the invention it is possible to obtain lithium-ion batteries with a relatively high coulombic efficiency or a relatively low initial, irreversible loss of mobile lithium in the first charge/discharge cycle of the batteries.

One subject of the invention is a method for producing precomposite particles, characterized in that mixtures comprising silicon particles, one or more oxygen-free polymers, one or more carbon additives (C additives) based on a carbon modification, and one or more dispersing liquids are dried by means of spray drying.

A further subject of the invention are the products (precomposite particles) obtainable by the aforesaid method.

A precomposite particle, generally speaking, is an agglomerate of silicon particles, C additives, and oxygen-free polymers. By virtue of their production in accordance with the invention, the silicon particles and the C additives in the precomposite particles are generally enveloped entirely or partly by the oxygen-free polymers. The surface of the precomposite particles is formed preferably entirely or partly, more preferably substantially, by the oxygen-free polymers. In light of these structural features, it was all the more surprising that the precomposite particles of the invention achieved the object of the invention—especially since the oxygen-free polymers also have binder properties. Through mere physical mixing of silicon particles, oxygen-free polymers, and C additives, or through noninventive drying of the mixtures of the invention, conversely, it is not possible to obtain precomposite particles with the structure in accordance with the invention, in particular with the inventively obtained distribution of oxygen-free polymers in the precomposite particles.

The oxygen-free polymers generally include no oxygen in their empirical chemical formula. Oxygen-free polymers may for example be crosslinked, branched, and in particular linear polymers which carry no oxygen-containing functional groups, such as alkoxy (e.g., ethers, acetals), hydroxyl (alcohols), oxo (ketones), formyl (aldehydes), carboxyl (carboxylic acids), metal carboxylato (carboxylic salts), alkyloxycarbonyl (esters), haloformyl (carbonyl halides), carbamoyl (carboxamides), carbamate (urethanes), sulfonato (sulfonic acid), metal sulfonato (sulfonic salts), anhydride, or siloxane groups.

Examples of oxygen-free polymers are polyacrylonitrile; polyolefins, such as polyethylene, ethylene-propylene-diene terpolymers; polyvinyl halides, such as polyvinyl chloride, polyvinylidene chloride, polyvinylidene fluoride or polytetrafluoroethylene; polyvinylaromatics or polyaromatics, such as polyaniline, polystyrene, polybenzimidazole, polypyrrole, poly-para-phenylene; polyaromatic hydrocarbons, such as pitches or tars, especially mesogenic pitch, mesophase pitch, petroleum pitch, and hard coal tar pitch. Preferred oxygen-free polymers are polyacrylonitrile, polyaniline, and polystyrene. Particularly preferred is polyacrylonitrile.

The oxygen-free polymers can be converted generally by thermal treatment into conductive carbon structures.

The precomposite particles are based on oxygen-free polymers preferably to an extent of ≤95 wt %, more preferably ≤90 wt %, and most preferably ≤85 wt %. The precomposite particles are based on oxygen-free polymers preferably to an extent of ≥5 wt %, more preferably ≥10 wt %, and most preferably ≥15 wt %. The aforesaid figures in wt % are based in each case on the dry weight of the precomposite particles.

Preferred C additives are selected from the group encompassing graphite, (conductive) carbon black, activated carbon, amorphous carbon, pyrolytic carbon, soft carbon, hard carbon, carbon nanotubes (CNTs), fullerenes, and graphene. Particularly preferred C additives are graphite, conductive carbon black, and activated carbon.

The precomposite particles are based on C additives preferably to an extent of ≤90 wt %, more preferably ≤85 wt %, and most preferably ≤80 wt %. The precomposite particles are based on C additives preferably to an extent of ≥3 wt %, more preferably ≥5 wt %, and most preferably ≥7 wt %. The aforesaid figures in wt % are based in each case on the dry weight of the precomposite particles.

Elemental silicon is used since it has an advantageously high storage capacity for lithium ions. Elemental silicon refers generally to high-purity polysilicon, with a low proportion of foreign atoms (for example, B, P, As), silicon specifically doped with foreign atoms (for example B, P, As), but also silicon from metallurgical processing, which may include elemental impurities (for example, Fe, Al, Ca, Cu, Zr, C).

Particularly preferred are silicon particles which contain ≥80 mol % of silicon and/or ≤20 mol % of foreign atoms, very preferably ≤10 mol % of foreign atoms.

The surface of the silicon particles may optionally be covered by an oxide layer or by other organic and inorganic groups. Particularly preferred silicon particles carry on their surface Si—OH or Si—H groups or organic groups attached covalently, such as alcohols or alkenes, for example. Through the organic groups it is possible, for example, to control the surface tension of the silicon particles. It can be adapted, accordingly, to the solvents or binders which are used in the production of the granules or in the production of the electrode coatings.

Prior to spray drying, the silicon particles have volume-weighted particle size distributions with median diameters $d_{50}$ of preferably 50 nm to 50 µm, more preferably 100 nm to 30 µm, and most preferably 150 nm to 20 µm.

The volume-weighted particle size distribution is determinable by static laser scattering, employing the Fraunhofer model or the Mie model, using the Horiba LA 950 instrument, with ethanol or isopropanol as dispersing medium for the silicon particles.

The silicon particles are preferably unagglomerated and more particular unaggregated.

Aggregated means that spherical or very largely spherical primary particles, of the kind formed, for example initially in gas phase operations for the production of silicon particles, coalesce in the further course of reaction in the gas phase operation and in this way form aggregates. In the further course of reaction, these aggregates may form agglomerates. Agglomerates are a cluster of primary particles or aggregates without covalent chemical bonds. In certain cases, agglomerates may be split back into the aggregates by kneading and dispersing processes, but often this is not possible. Aggregates can be broken down into the primary particles not at all, or only partly, by these processes. The presence of silicon particles in the form of aggregates or agglomerates may be visualized using conventional scanning electron microscopy (SEM), for example. Conversely, static light scattering methods for determining the particle size distributions are unable to distinguish between aggregates or agglomerates.

The silicon particles have a sphericity of preferably $0.3 \leq \psi \leq 1$, more preferably $0.4 \leq \psi \leq 1$, and most preferably $0.5 \leq \psi \leq 1$. The sphericity $\psi$ is the ratio of the surface area of a sphere of equal volume to the actual surface of a body (definition by Wadell). Sphericities may be determined, for example, from conventional SEM micrographs.

The silicon particles preferably have certain properties of bulk materials. Properties of bulk materials are described for example in the international standard FEM 2.581 of the "Federation Europeenne de la Manutention". The standard FEM 2.582 defines the general and specific properties of bulk materials with regard to their classification. Characteristic values which describe the consistency and the condition of the materials are, for example, grain morphology and grain size distribution (FEM 2.581/FEM 2.582: General characteristics of bulk products with regard to their classification and their symbolization).

According to DIN ISO 3435, bulk materials can be subdivided into six different grain morphologies depending on the nature of the grain edges:

I: sharp edges with approximately equal extents in the three dimensions (e.g.: cubes);

II: sharp edges of which one is much longer than the other two (e.g.: prism, blade);

III: sharp edges of which one is much smaller than the two others (e.g.: plate, flakes);

IV: round edges with approximately equal extents in the three dimensions (e.g.: sphere);

V: round edges, much greater in one direction than in the other two (e.g.: cylinder, rod);

VI: fibrous, filamentary, curliform, convoluted.

The silicon particles preferably have grain morphologies I to VI, more preferably I, II, III or IV, and with particular preference I or IV in accordance with DIN ISO 3435.

The precomposite particles are based preferably on silicon particles to an extent of ≤50 wt %, more preferably ≤45 wt %, and most preferably ≤40 wt %. The precomposite particles are based on silicon particles preferably to an extent of ≥2 wt %, more preferably ≥5 wt %, and most preferably ≥7 wt %. The aforesaid figures in wt % are based in each case on the dry weight of the precomposite particles.

The silicon particles can be produced, for example, by means of vapor deposition or, preferably, by grinding operations.

Grinding operations contemplated are dry or wet grinding operations. They are preferably carried out using jet mills, such as opposed jet mills, or impact mills, planetary ball mills or stirred ball mills. The jet mills preferably have an integrated pneumatic classifier, which may be static or dynamic in design, or are operated in a circuit with an external pneumatic classifier.

Wet milling takes place in general in a suspension with organic or inorganic dispersing media. Preferred dispersing media are the dispersing liquids described further below.

In the wet milling, preference is given to using grinding media whose average diameter is 10 to 1000 times greater than the 90% percentile $d_{90}$ of the diameter of the milling material introduced, based on the particle size volume distribution. Particularly preferred are grinding media whose average diameter is 20 to 200 times greater than the $d_{90}$ of the initial distribution of the milling material.

As dispersing liquid it is possible to use organic and/or inorganic solvents. Mixtures of two or more dispersing liquids can also be used.

One example of an inorganic solvent is water.

Organic solvents are, for example, hydrocarbons, ethers, esters, nitrogen-functional solvents, sulfur-functional solvents, or alcohols. The organic solvents contain preferably 1 to 12 carbon atoms and more preferably 1 to 8 carbon atoms. Examples of alcohols are methanol, ethanol, propanol, butanol, and benzyl alcohol. Hydrocarbons may for example be aliphatic or aromatic, substituted or unsubstituted. Examples thereof are chlorinated hydrocarbons, such as dichloromethane, trichloromethane, tetrachloromethane, 1,2-dichloroethane, and trichloroethylene; unsubstituted hydrocarbons, such as pentane, n-hexane, hexane isomer mixtures, heptane, octane, wash benzine, petroleum ether, benzene, toluene, and xylenes. Examples of ethers are dioxane, tetrahydrofuran, diethyl ether, diisopropyl ether, and diethylene glycol dimethyl ether. Examples of esters are ethyl acetate, butyl acetate, propyl propionate, ethyl butyrate, and ethyl isobutyrate. Examples of nitrogen-functional solvents are nitrobenzene, dimethylformamide, N-methyl-2-pyrrolidone, and N-ethyl-2-pyrrolidone. An example of a sulfur-functional solvent is dimethyl sulfoxide. Preferred solvents are ethanol and 2-propanol, dimethylformamide, N-methyl-2-pyrrolidone, N-ethyl-2-pyrrolidone, dimethyl sulfoxide, or mixtures of these solvents.

The dispersing liquid is generally in liquid form at room temperature and has a viscosity at 20° C. of preferably ≤100 mPas and more preferably ≤10 mPas. The dispersing liquid is preferably inert or of low reactivity toward silicon.

The mixtures used for spray drying contain preferably ≥5 wt %, more preferably ≥10 wt %, and most preferably ≥20 wt % of dispersing liquid. The mixtures contain preferably ≤99 wt %, more preferably ≤98.5 wt %, and most preferably ≤98 wt % of dispersing liquid. The aforesaid figures in wt % are based in each case on the dry weight of the mixtures used for spray drying.

The mixtures may comprise one or more adjuvants. Examples thereof are inactive materials based on metals (such as copper, zirconium), oxides, carbides or nitrides.

The precomposite particles are based on adjuvants preferably to an extent of 0 to 30 wt %, more preferably 1 to 25 wt %, and most preferably 2 to 20 wt %, based on the dry weight of the precomposite particles. In one preferred, alternative embodiment, the precomposite particles contain no adjuvants.

The mixtures may also comprise one or more additives, such as, for example, pore formers, flow control agents, dopants, or substances which improve the electrochemical stability of the electrode in the battery. Preferred additives are pore formers. Commonplace pore formers may be used.

The precomposite particles are based on additives preferably to an extent of 0 to 50 wt %, more preferably 1 to 40 wt %, and most preferably 2 to 30 wt %, based on the dry weight of the precomposite particles. In one preferred, alternative embodiment, the precomposite particles contain no additives.

The precomposite particles are obtained preferably in the form of isolated particles or loose agglomerates of precomposite particles, but generally not in the form of aggregates of precomposite particles. Any agglomerates of precomposite particles can be separated into the individual precomposite particles, using kneading or dispersing processes, for example. Aggregates of precomposite particles cannot be separated into the individual particles in this way without destruction of precomposite particles.

The precomposite particles are preferably spherical, but may also have a sliver shape or be in the form of hollow spheres, with particular preference being given to solid spherical particles.

The composite particles have a sphericity of preferably $0.3 \leq \psi \leq 1$, more preferably $0.5 \leq \psi \leq 1$, and most preferably $0.8 \leq \psi \leq 1$. The sphericity $\psi$ is the ratio of the surface area of a sphere of equal volume to the actual surface of a body (definition by Wadell). Sphericities may be determined, for example, from conventional SEM micrographs.

The volume-weighted particle size distribution with diameter percentiles $d_{50}$ of the precomposite particles is preferably ≤100 μm, more preferably ≤50 μm, and most preferably ≤20 μm, but preferably ≥1 μm.

The particle size distribution of the precomposite particles may be bimodal or polymodal and is preferably monomodal, more preferably narrow. The volume-weighted particle size distribution of the precomposite particles has a breadth $(d_{90}-d_{10})/d_{50}$ of preferably ≤1.5, more preferably ≤1, and most preferably ≤0.9.

The volume-weighted particle size distribution of the precomposite particles was determined by static laser scattering, employing the Mie model, using the Horiba LA 950 instrument, with ethanol as dispersing medium for the precomposite particles.

The precomposite particles typically have BET surface areas of preferably 1 to 300 $m^2/g$, more preferably 2 to 250 $m^2/g$, and most preferably 5 to 200 $m^2/g$ (determined according to DIN ISO 9277:2003-05).

The mixtures which are used for the spray drying may be produced by any desired mixing of their individual constituents. The mixing is not tied to any particular procedure. The oxygen-free polymers, the C additives, and the silicon particles may be mixed together or in succession with dispersing liquid. First of all, preferably, oxygen-free polymers are mixed with dispersing liquid, and then C additives and silicon particles are added together or separately, simultaneously or in succession.

The oxygen-free polymers are preferably in solution in the dispersing liquids. With preference it is possible to dissolve at least 1 g of oxygen-free polymers in 100 mL of dispersing liquid at 20° C. The silicon particles and the C additives are customarily in dispersion in the dispersing liquids.

Mixing may be carried out in commonplace mixing apparatus, as for example in rotor-stator machines, high-energy mills, planetary mixers, kneading devices, magnetic stirrers, stirred ball mills, vibrating plates, dissolvers, Ultra-turrax devices, roller beds, or ultrasound devices. Ultrasound may also be employed.

The spray drying may be carried out in systems commonplace for the purpose and under conditions which are commonplace per se. The atomization in spray drying systems may be accomplished, for example, using single-fluid, two-fluid or multifluid nozzles or with a rotating disk. The entry temperature of the mixture for drying into the spray drying system is preferably greater than or equal to the boiling temperature of the mixture to be dried, and more preferably is higher by ≥10° C. than the boiling temperature of the mixture to be dried. For example, the entry temperature is preferably 80° C. to 220° C., more preferably 100° C. to 180° C. The exit temperature is preferably ≥30° C., more preferably ≥40° C., and most preferably ≥50° C. In general the exit temperature is in the range from 30° C. to 100° C., preferably from 45° C. to 90° C. The pressure in the spray drying system is preferably the ambient pressure.

Drying may take place in ambient air, in synthetic air or, preferably, in an inert gas atmosphere, such as in nitrogen or argon atmosphere, for example. Especially when using organic solvents as dispersing fluid, the use of inert gas is preferred.

In the spray drying system, the sprayed mixtures have primary droplet sizes of preferably 1 to 100 μm, more preferably 2 to 50 μm, and most preferably 5 to 20 μm.

Via the settings of the inlet temperature, of the gas flow, and of the pumping rate (feed), the choice of the nozzle, of the aspirator, the choice of the dispersing liquid, or else of the solids concentration of the spraying dispersion, it is possible, in a manner known per se, to adjust the size of the primary particles, residual moisture in the product, and the yield of the product. For example, at higher solids concentrations of the spraying suspension, primary particles having larger particle sizes are obtained. The gas flow influences the particle size as well. High gas flows are used preferably for fine particles, and low gas flows preferably for larger particles. The gas flow is preferably 84 to 820 L/h, more preferably 350 to 600 L/h. The gas streams can be fluidized by an aspirator and thereby circulated. The aspirator may be set, for example, at 0 to 35 $m^3/h$, with preference being given to fluidization of 20 to 35 $m^3/h$.

The precomposite particles obtained by spray drying may be separated from the gas stream in a variety of commonplace ways, as for example by way of filters, classifying methods, such as sifting, or—preferably—cyclones.

In order to remove residual moisture, the precomposite particles may optionally be dried further or directly further exploited.

A further subject of the invention is a method for producing Si/C composite particles, characterized in that mixtures comprising silicon particles, one or more oxygen-free polymers, one or more C additives based on a carbon modification, and one or more dispersing liquids are dried by means of spray drying, and the precomposite particles thus obtained are thermally treated.

A further subject of the invention are the Si/C composite particles obtainable by the aforesaid method.

The thermal treatment converts the precomposite particles into Si/C composite particles. The thermal treatment of the precomposites generally has the effect of carbonizing the oxygen-free polymers. In that procedure the oxygen-free polymers are converted preferably into inorganic carbon. The carbon yields when carbonizing the oxygen-free polymers are preferably ≥15%, more preferably ≥20%, and most preferably ≥25%, based on the total weight of the oxygen-free polymers. The carbon in the Si/C composite particles may be crystalline or amorphous and may also include mixtures of crystalline and amorphous constituents.

Because of the inventive production of the Si/C composite particles, the silicon particles and the C additives therein are generally embedded entirely or partly in carbon. The surface of the Si/C composite particles preferably consists entirely or partly, more preferably substantially, of carbon.

Through mere physical mixing of silicon particles, oxygen-free polymers, and C additives and subsequent carbonization, or through noninventive drying of the mixtures of the invention and subsequent carbonization, conversely, it is not possible to obtain Si/C composite particles with structure in accordance with the invention, in particular with the inventively obtained distribution of carbon in the Si/C composite particles.

The Si/C composite particles are obtained preferably in the form of isolated particles or loose agglomerates of Si/C composite particles, but generally not in the form of aggregates of Si/C composite particles. Any agglomerates of Si/C composite particles can be separated into the individual Si/C composite particles, by means of kneading or dispersing processes, for example. Aggregates of Si/C composite particles cannot be separated into the individual particles in this way without destruction of Si/C composite particles.

In comparison to similar Si/C composite particles produced using oxygen-containing polymers, Si/C composite particles of the invention lead to lithium-ion batteries having a greater coulombic efficiency or a lower initial, irreversible loss of mobile lithium in the first charge/discharge cycle of the batteries. Consequently, the Si/C composite particles of the invention are inevitably structurally different from such conventional Si/C composite particles.

The Si/C composite particles are preferably spherical, but may also have a sliver shape or be in the form of hollow spheres, particular preference being given to solid spherical particles.

The Si/C composite particles have a sphericity of preferably $0.3 \leq \psi \leq 1$, more preferably $0.5 \leq \psi \leq 1$, and most preferably $0.8 \leq \psi \leq 1$. The sphericity $\psi$ is the ratio of the surface area of a sphere of equal volume to the actual surface of a body (definition by Wadell). Sphericities may be determined, for example, from conventional SEM micrographs.

The Si/C composite particles have volume-weighted particle size distributions with diameter percentiles $d_{50}$ of preferably ≥1 μm, more preferably ≥3 μm, and most preferably ≥6 μm. The Si/C composite particles have $d_{50}$ values of preferably ≤100 μm, more preferably ≤50 μm, very preferably ≤36 μm, and most preferably ≤20 μm.

The particle size distribution of the Si/C composite particles may be bimodal or polymodal and is preferably monomodal, more preferably narrow. The volume-weighted particle size distribution of the Si/C composite particles has a breadth $(d_{90}-d_{10})/d_{50}$ of preferably ≤1.5, more preferably ≤1.2, very preferably ≤1, and most preferably ≤0.9.

The volume-weighted particle size distribution of the Si/C composite particles was determined by static laser scattering, employing the Mie model, using the Horiba LA 950 instrument, with ethanol as dispersing medium for the Si/C composite particles.

The Si/C composite particles are preferably porous. The Si/C composite particles comprise pores having diameters of preferably ≥60 nm, more preferably ≥100 nm, and most preferably ≥200 nm. The pores have diameters of preferably ≤1400 nm, more preferably ≤700 nm, and most preferably ≤400 nm (method of determination: scanning electron microscopy (SEM)).

With particular preference there are silicon particles located in pores. The proportion of the silicon particles that are located in pores is preferably ≥5%, more preferably ≥20%, and most preferably ≥50%, based on the total number of silicon particles in the Si/C composite particles (method of determination: scanning electron microscopy (SEM)).

The Si/C composite particles are based on silicon to an extent of preferably 5 to 50 wt %, more preferably 10 to 40 wt %, most preferably 20 to 40 wt %; preferably 50 to 95 wt %, more preferably 60 to 85 wt %, most preferably 60 to 80 wt % carbon. Moreover, there may be oxygen contents of, for example, ≤20 wt %, preferably ≤10 wt %, and more preferably ≤5 wt %, in the form, for example, of a native $SiO_2$ layer on the silicon particles. Certain amounts of nitrogen in the Si/C composite particles are advantageous and amount for example to 0.5 to 10 wt % and more preferably to between 2 and 5 wt %. Nitrogen is present here preferably in chemically bonded form as heterocycles—for example, as pyridine units or pyrrole units (N). Besides the stated main constituents, there may also be further chemical elements present, in the form of a deliberate addition or of chance impurity: such as, for example, Li, Fe, Al, Cu, Ca, K, Na, S, Cl, Zr, Ti, Pt, Ni, Cr, Sn, Mg, Ag, Co, Zn, B, P, Sb, Pb, Ge, Bi, rare earths; the amounts thereof are preferably ≤1 wt % and more preferably ≤100 ppm. The aforesaid figures in wt % are based in each case on the total weight of the Si/C composite particles.

The polymers which are converted into inorganic carbon in the thermal treatment of the precomposite particles introduce preferably ≤3 wt % of oxygen, more preferably ≤2 wt % of oxygen, and most preferably ≤1 wt % of oxygen into the Si/C composite particles, based on the total weight of the Si/C composite particles. The polymers which are converted into inorganic carbon in the thermal treatment of the precomposite particles are preferably the oxygen-free polymers. As a result of the use of oxygen-free polymers, the amount of additional oxygen introduced by the polymer is minimal.

The thermal treatment of the precomposite particles takes place at temperatures of preferably 400 to 1400° C., more preferably 700 to 1200° C., and most preferably 900 to 1100° C.

The thermal treatment may take place, for example, in a tube furnace, rotary tube furnace or fluidized bed reactor. Through choice of the type of reactor it is possible to carry out the carbonization statically or with continual mixing of the reaction medium.

The thermal treatment may take place under aerobic or anaerobic conditions. For example, a first thermal treatment may be carried out at temperatures up to 300° C. in an oxygen-containing atmosphere, and a second thermal treatment at temperatures >300° C. in an inert gas atmosphere. The thermal treatment is carried out preferably in an inert gas atmosphere, such as nitrogen or preferably argon atmosphere. The inert gas atmosphere may optionally further include fractions of a reducing gas, such as hydrogen. Preferably, the thermal treatment is accomplished anaerobically. The inert gas atmosphere may be static over the reaction medium or may flow over the reaction mixture in the form of a gas flow. The flow rates in that case are preferably up to 1 liter per minute, more preferably 100 to 600 mL/min, and most preferably 200 to 250 mL/min, particularly in the case of the carbonization of 2 to 150 g of precomposite particles or a reactor volume of 7000 to 11-000 cm$^3$. The heating rates when heating the reaction mixture are preferably 1 to 20° C. per minute, more preferably 1 to 15° C./min, very preferably 1 to 10° C./min, and most preferably 3 to 5° C./min. Also possible, furthermore, is a staged operation with different intermediate temperatures and intermediate heating rates. When the target temperature has been reached, the reaction mixture is customarily conditioned at the temperature for a certain time or immediately cooled thereafter. Hold times of, for example, 30 min to 24 h, preferably 1 to 10 h, and more preferably 2 to 3 h are advantageous. Cooling may be carried out actively or passively, uniformly or in stages.

The resultant Si/C composite particles may be supplied immediately to their further exploitation, or alternatively may first be aftertreated mechanically, by milling or sieving, for example, or freed from oversize or undersize by classifying technologies (sieving, sifting). With preference, mechanical aftertreatments of classifying are omitted, and more particularly any milling, sieving or sifting is omitted.

The Si/C composite particles can be used for producing electrode materials. Alternatively, the surface of the Si/C composite particles may also first be modified, by application of one or more coatings, for example, more particularly by application of a carbon coating. Subsequently, Si/C composite particles thus modified may also be used for producing electrode materials.

A further subject of the present invention is the use of the Si/C composite particles in electrode materials for lithium-ion batteries, more particularly for producing the negative electrodes of lithium-ion batteries.

The Si/C composite particles can be used as a silicon component for electrode materials of lithium-ion batteries. Lithium-ion batteries of this kind may be produced for example as described in WO 2015/117838.

Surprisingly, through the procedure according to the invention, Si/C composite particles may be obtained that have the desired particle size and the desired narrow particle size distribution. In this way, spherical, micro-scale, unaggregated and/or unsintered Si/C composite particles are accessible. There is therefore no need for costly and inconvenient removal of oversize or undersize. In this way it is also possible, advantageously, to obtain porous Si/C composite particles, whose pores have the capacity to buffer the change in volume of silicon in the course of the charging/discharging of lithium-ion batteries. The Si/C composite particles can be further processed advantageously into active anode materials for lithium-ion batteries. Unexpectedly, with the Si/C composite particles of the invention, it is possible to obtain lithium-ion batteries having higher coulombic efficiency or a lower initial, irreversible loss of mobile lithium in the first charge/discharge cycle of the batteries. The particle structure and the particle size of the Si/C composite particles are critical to their processing and electrochemical performance in active anode materials of lithium-ion batteries.

DETAILED DESCRIPTION OF PREFERRED EMBODIMENTS

The examples which follow serve for further elucidation of the invention.

Analytical methods and instruments used for characterizing the Si/C composites obtained were as follows:
Scanning Electron Microscopy (SEM/EDX):
The microscopic studies were carried out with a Zeiss Ultra 55 scanning electron microscope and an INCA x-sight energy-dispersive x-ray spectrometer. Prior to the study, the samples were vapor-coated with carbon in order to prevent charging phenomena, using a Baltec SCD500 sputter/carbon coating unit. The cross sections of the Si/C composite particles, which are shown in the figures, were produced using a Leica TIC 3X ion cutter at 6 kV.

Inorganic Analysis/Elemental Analysis:
The C contents reported in the examples were determined using a Leco CS 230 analyzer; for the determination of 0 and, where appropriate, N and H contents, a Leco TCH-600 analyzer was employed. The qualitative and quantitative determination of other reported elements in the Si/C composite particles was carried out by means of ICP (inductively coupled plasma)-emission spectrometry (Optima 7300 DV from Perkin Elmer). For this analysis, the samples were subjected to acid digestion (HF/HNO$_3$) in a microwave (Microwave 3000 from Anton Paar). The ICP-OES determination is based on ISO 11885 "Water quality—Determination of selected elements by inductively coupled plasma optical emission spectrometry (ICP-OES) (ISO 11885: 2007); German version of EN ISO 11885:2009", which is employed for investigation of acidic aqueous solutions.

Particle Size Determination:

For the purposes of this invention, the particle size distribution was determined according to ISO 13320 by means of static laser scattering with a Horiba LA 950. Here, when preparing the samples, it is necessary to pay particular attention to the dispersal of the particles in the measurement solution, so as not to measure the size of agglomerates rather than individual particles. For this purpose, the Si/C composite particles were dispersed in ethanol, and before the measurement the dispersion was treated with 250 W ultrasound for 4 minutes in a Hielscher UIS250v laboratory ultrasound device with LS24d5 sonotrode.

Example 1 (Comparative)

Spray Drying of PAN: Formation of Aggregated PAN Fibers:

12.5 g of polyacrylonitrile (PAN) were dissolved at room temperature in 500 ml of dimethylformamide (DMT). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~40; aspirator 100%; pump 20%).

Figure 1:
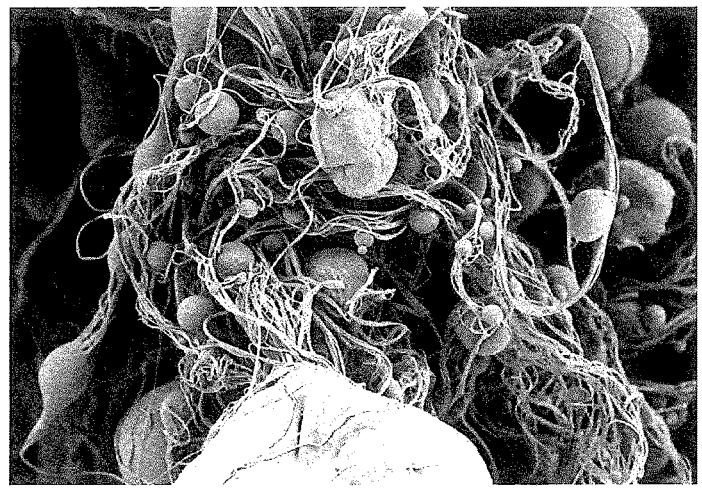
FIG. 1 is an SEM image of the product of Comparative Example 1, showing fibrous coils of nanoscale PAN fibers and misshapen PAN balls

FIG. 1 shows the SEM image of the resultant powder (2500 times magnification). The product was colorless and consisted of fibrous coils of nanoscale PAN fibers and also individual misshapen PAN balls.

Example 2 (Comparative)

Spray drying of PAN and production of aggregated C particles:

1.5 g of polyacrylonitrile (PAN) were dissolved at room temperature in 100 ml of dimethylformamide (DMF). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~30; aspirator 100%; pump 20%). A colorless powder was obtained.

Of this powder, 647 mg were placed into a fused silica boat (QCS GmbH) and carbonized in a three-zone tube furnace (TFZ 12/65/550/E301; Carbolite GmbH), using cascade regulation, including a type N probe element with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, 173 mg of a black powder were obtained (yield 27%).

Figure 2:
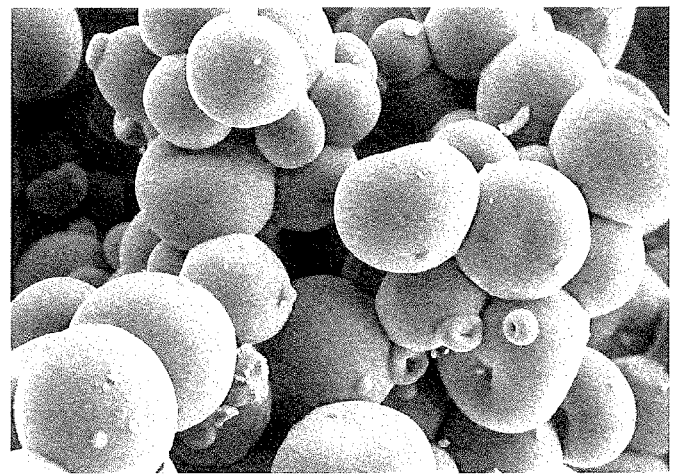
FIG. 2 is an SEM image of the product of Comparative Example 2 showing C particles in the form of aggregated microscale balls.

The SEM image (7500 times magnification) of the product in FIG. 2 shows C particles which are in the form of aggregated, microscale balls.

Example 3 (Comparative)

Production of Aggregated Si/C Composite Particles:

12.0 g of polyacrylonitrile (PAN) were dissolved at room temperature in 800 ml of dimethylformamide (DMF). Dispersed in this PAN solution by means of ultrasound (Hielscher UIS250V; amplitude 80%, cycle: 0.9; duration: 30 min) were 8.6 g of a silicon nanopowder suspension (20.3% in ethanol; corresponding to 1.75 g of silicon). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~30; aspirator 100%; pump 20%). 11.1 g of a brown powder were obtained (80% yield).

10.6 g of the resultant Si/PAN precomposite were placed into a fused silica boat (QCS GmbH) and carbonized in a three-zone tube furnace (TFZ 12/65/550/E301; Carbolite GmbH), using cascade regulation, including a type N thermocouple with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, a black powder was obtained (yield 42%).

Figure 3:
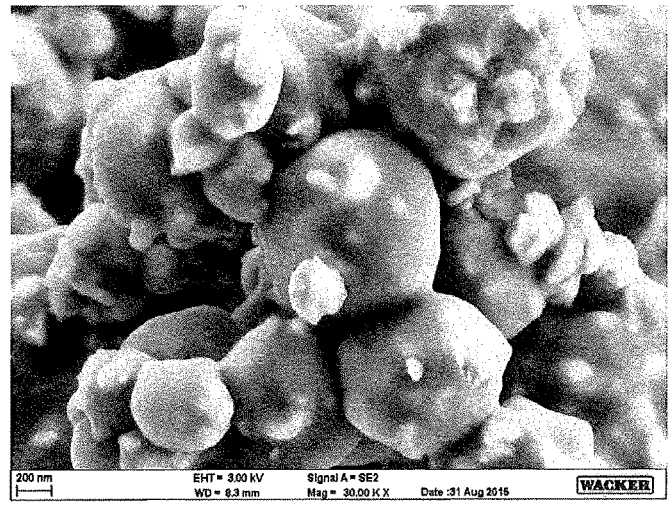
FIG. 3 is an SEM of composite particles which are aggregated carbon balls containing nano-Si.

The SEM image (30,000 times magnification) of the product in FIG. 3 shows composite particles which are in the form of aggregated, microscale carbon balls containing nano-Si particles in the interior.

Elemental composition: Si 28 wt %; C 62.4 wt %; O 5.82 wt %; N 3.63 wt %; B<50 ppm; P<50 ppm; Al<50 ppm; Ca<50 ppm; Cu<25 ppm; K<50 ppm; Li<10 ppm; Zr 1300 ppm. Particle size distribution: monomodal; $D_{10}$: 5.36 nm, $D_{50}$: 9.69 nm, $D_{90}$: 16.4 μm; $(D_{90}-D_{10})/D_{50}=1.14$.

Example 4

Unaggregated Si/C Composite Particles:

20.0 g of polyacrylonitrile (PAN) were dissolved at room temperature in 1380 ml of dimethylformamide (DMF). Dispersed into the PAN solution by means of ultrasound (Hielscher UIS250V; amplitude 80%, cycle: 0.9; duration: 30 min) were 25.0 g of a silicon nanopowder suspension (21% in ethanol; corresponding to 5 g of nano-Si) and 11.2 g of graphite (KS6L). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~30; aspirator 100%; pump 20%). 31.2 g of a brown-black powder were obtained (86% yield).

30.7 g of the resultant precomposite were placed into a fused silica boat (QCS GmbH) and carbonized in a three-zone tube furnace (TFZ 12/65/550/E301; Carbolite GmbH), using cascade regulation, including a type N probe element with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, 20.4 g of a black powder were obtained (yield 66%).

Figure 4:
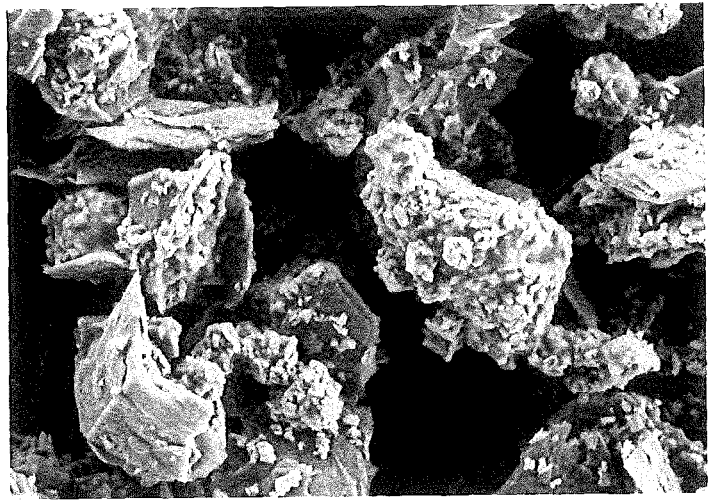
FIG. 4 is an SEM of non-aggregated microscale C/Si particles of Example 4.
Figure 5:
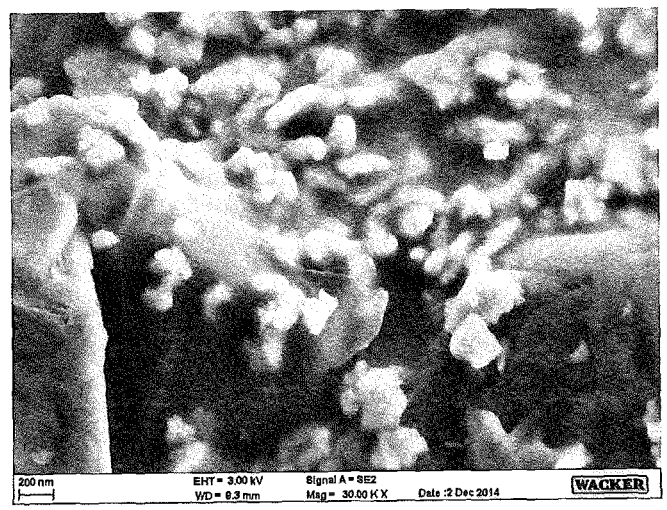
FIG. 5 is an SEM of the product of Example 4 at higher magnification.

The SEM image (75,000 times magnification) of the product in FIG. 4 shows unaggregated, microscale Si/C composite particles which in the interior contain graphite particles and nano-Si particles; the SEM image in FIG. 5 (30,000 times magnification) shows the carbon-coated surface of the particles.

Elemental composition: Si 20.6 wt %; C 75.0 wt %; O 3.5 wt %; N 2.5 wt %; B<50 ppm; P<50 ppm; Al<25 ppm; Ca<50 ppm; Cu<10 ppm; K<50 ppm; Li<10 ppm; Zr 1100 ppm.

Particle size distribution: monomodal; $D_{10}$: 4.68 μm, $D_{50}$: 7.26 μm, $D_{90}$: 11.6 μm; $(D_{90}-D_{10})/D_{50}=0.95$.

Example 5

Unaggregated Si/C Composite Particles:

10.8 g of polyacrylonitrile (PAN) were dissolved at room temperature in 720 ml of dimethylformamide (DMF). Dispersed into the PAN solution by means of ultrasound (Hielscher UIS250V; amplitude 80%, cycle: 0.9; duration: 30 min) were 12.6 g of a silicon nanopowder suspension (19.8% in isopropanol; corresponding to 2.55 g of nano-Si) and 3.15 g of conductive carbon black (Super P). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~30; aspirator 100%; pump 20%).

Figure 6:
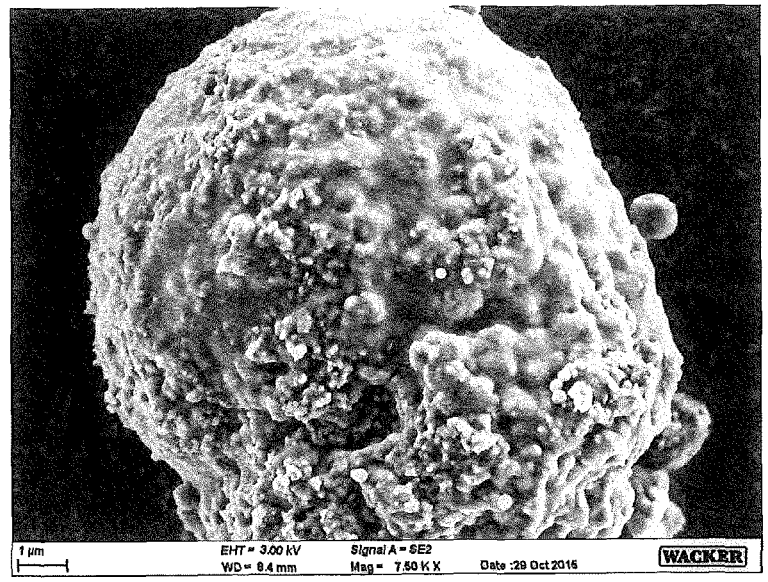
FIG. 6 is an SEM of non-aggregated polymer coated Si/C composite particles of Example 5.

13.8 g of a brown-black powder were obtained (84% yield). The SEM image (7500 times magnification) in FIG. 6 shows unaggregated, microscale precomposite particles covered completely with oxygen-free polymer.

Figure 7:
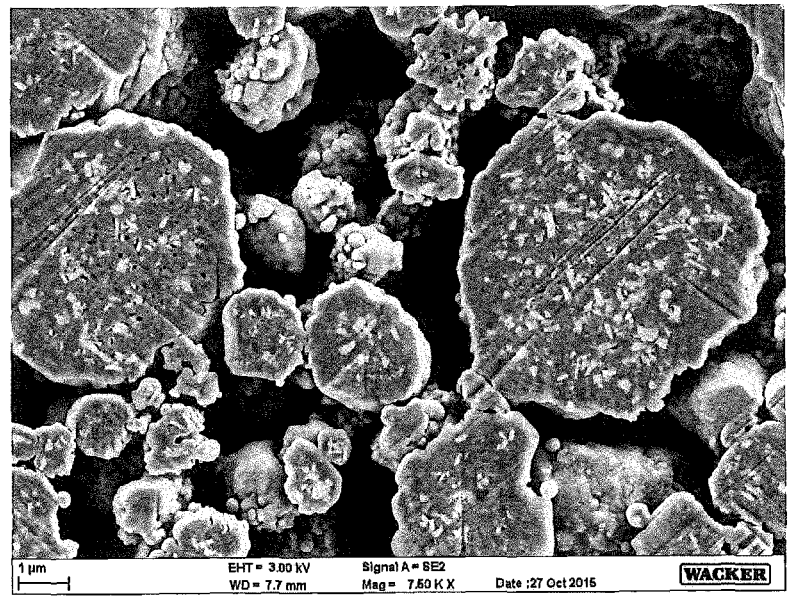
FIG. 7 is an SEM of the particles of Example 5 illustrating a uniform distribution of components within the particles.

The associated cross section in FIG. 7 (7500 times magnification) shows the uniform distribution of the components within the precomposite particle.

13.7 g of the resultant precomposite were placed into a fused silica boat (QCS GmbH) and carbonized in a three-zone tube furnace (TFZ 12/65/550/E301; Carbolite GmbH), using cascade regulation, including a type N probe element with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, 7.71 g of a black powder were obtained (yield 56%).

Figure 8:
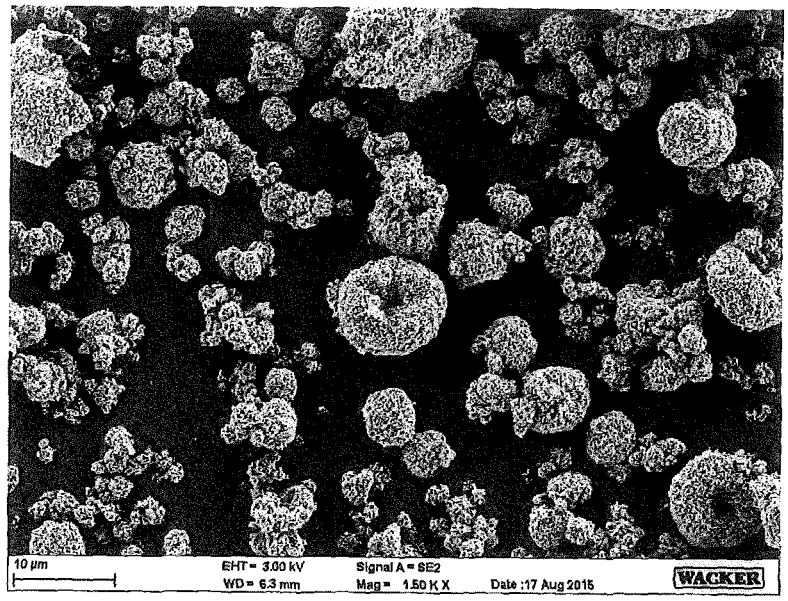
FIG. 8 is an SEM image of the composite particles of Example 5 following carbonization.

The SEM image (1500 times magnification) of the product in FIG. 8 shows unaggregated, microscale Si/C composite particles which in the interior contain graphite particles and nano-Si particles.

Figure 9:
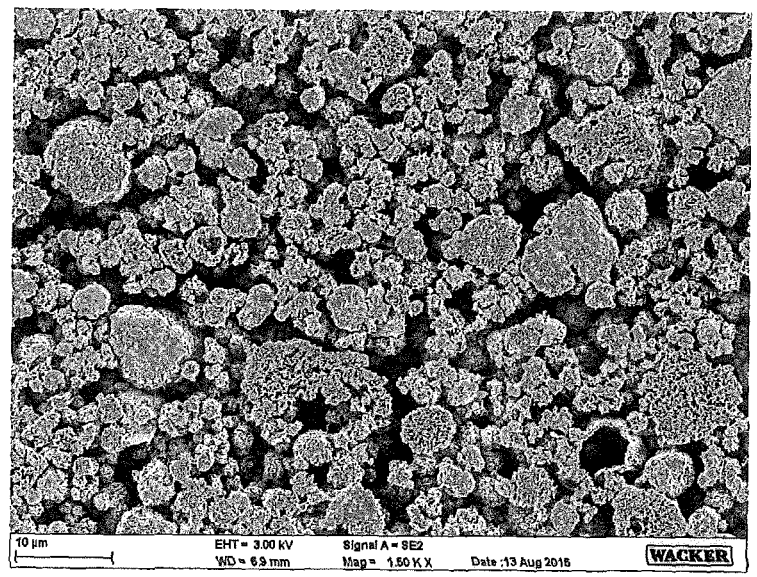
FIG. 9 is an SEM showing the uniform distribution and complete carbon envelopment of the carbonized product of Example 5.

FIG. 9 shows the uniform distribution of the components and complete envelopment with carbon in the cross section (1500 times magnification). Elemental composition: Si 24.4 wt %; C 65.6 wt %; O 4.62 wt %; N 2.67 wt %; B<50 ppm; P<50 ppm; Al<25 ppm; Ca<50 ppm; Cu<10 ppm; K<50 ppm; Li<10 ppm; Zr 800 ppm.

Particle size distribution: monomodal; $D_{10}$: 4.15 μm, $D_{50}$: 6.32 μm, $D_{90}$: 9.54 μm; $(D_{90}-D_{10})/D_{50}=0.85$.

2.00 g of the Si/C composite particles were dispersed in 15.8 g of a 1.4 wt % solution of sodium carboxymethylcellulose (Daicel, grade 1380) in water by means of a dissolver at a circulation speed of 2.6 m/s for 5 min and of 13 m/s for 30 min with cooling at 20° C. After degassing, the dispersion was applied using a film-drawing frame with a 0.18 mm slot height (Erichsen, model 360) onto a copper foil (Schlenk Metallfolien, SE-Cu58) with a thickness of 0.030 mm. The electrode coating thus produced was subsequently dried for 120 minutes at 80° C. and an air pressure of 1 bar. The mean weight of the dry electrode coating per unit surface area was 1.36 mg/cm².

The electrochemical determination of the initial coulombic efficiency was carried out on a half-cell without reference. The electrode coating was used as the working electrode, and lithium foil (Rockwood Lithium, thickness 0.5 mm) was used as the counterelectrode. A glass fiber microfilter (GF Type D, Whatman) impregnated with 120 μl of electrolyte acted as the separator. The electrolyte used consisted of a 1-molar solution of lithium hexafluorophosphate in a 3:7 (v/v) mixture of ethylene carbonate and diethyl carbonate to which 2 wt % of vinylene carbonate had been added. The cell was constructed in a glovebox (<1 ppm $H_2O$, $O_2$); the water content in the dry mass of all the components used was below 20 ppm.

The electrochemical measurement was carried out at 20° C. The charging or lithiation of the electrode took place by the cc/cv method (constant current/constant voltage) with a constant current of 33 mA/g (corresponding to C/25) and, after attainment of the voltage limit of 5 mV, at constant voltage until the current dropped below 20 mA/g. The cell was discharged by the cc method (constant current) with a constant current of 33 mA/g (corresponding to C/25) until the voltage limit of 1.5 V was attained. The specific current selected was based on the weight of the coating.

The initial coulombic efficiency of the Si/C composite particle was 84.6±0.6% (mean value from measurement in triplicate) and is therefore significantly higher than for example 7 (comparative).

Example 6

Unaggregated Si/C Composite Particles:

9.00 g of polyacrylonitrile (PAN) were dissolved at room temperature in 600 ml of dimethylformamide (DMF). Dispersed into the PAN solution by means of ultrasound (Hielscher UIS250V; amplitude 80%, cycle: 0.9; duration: 30 min) were 13.8 g of a silicon nanopowder suspension (26.9% in ethanol; corresponding to 3.7 g of nano-Si) and 7.01 g of ground activated carbon. The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 130° C.; $N_2$ gas flow ~30; aspirator 100%; pump 20%). 21.4 g of a brown-black powder were obtained (88% yield).

21.0 g of the resultant precomposite were placed into a fused silica boat (QCS GmbH) and carbonized in a three-zone tube furnace (TFZ 12/65/550/E301; Carbolite GmbH), using cascade regulation, including a type N probe element with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, 12.3 g of a black powder were obtained (yield 58%).

Figure 10:
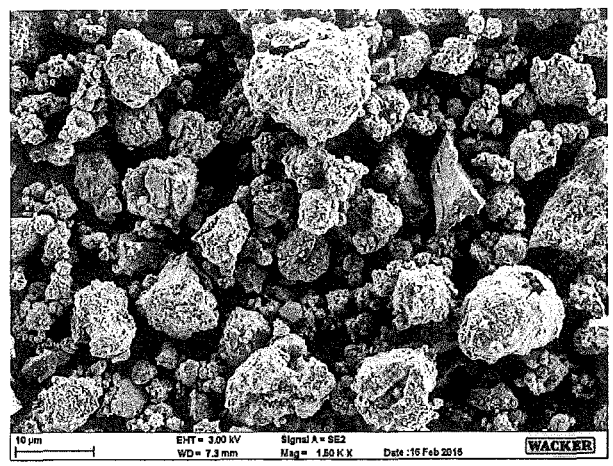
FIG. 10 is an SEM of the carbonized product of Example 6.

The SEM image (1500 times magnification) of the product in FIG. 10 shows unaggregated, microscale Si/C composite particles which in the interior contain graphite particles and nano-Si particles.

Figure 11:
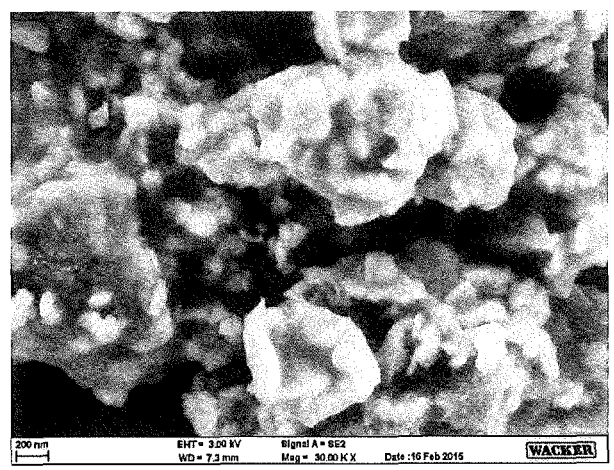
FIG. 11 is a higher magnification SEM image of the carbonized composite particles of Example 6 showing complete envelopment with carbon.

FIG. 11 shows the complete envelopment of the particles with carbon (30,000 times magnification).

Elemental composition: Si 19.6 wt %; C 72.2 wt %; O 5.5 wt %; N 2.4 wt %; B<50 ppm; P 70 ppm; Al 2300 ppm; Ca 945 ppm; Cu 15 ppm; K 323 ppm; Li<10 ppm; Zr 1100 ppm.

Particle size distribution: monomodal; $D_{10}$: 4.57 μm, $D_{50}$: 7.18 μm, $D_{90}$: 11.2 μm; $(D_{90}-D_{10})/D_{50}=0.92$.

Example 7 (Comparative)

Use of an Oxygen-Containing Polymer for Producing Si/C Composite Particles:

37.8 g of polyvinyl alcohol (PvOH; 20% in water) (LL620, trade name of Wacker Chemie) were dissolved at room temperature in 600 ml of water/ethanol mixture (1:1). Dispersed into the PvOH solution by means of ultrasound (Hielscher UIS250V; amplitude 80%, cycle: 0.9; duration: 30 min) were 5.87 g of a silicon nanopowder suspension (21.3% in ethanol; corresponding to 1.25 g of nano-Si) and 1.58 g of conductive carbon black (Super P). The resulting dispersion was sprayed and dried with a laboratory spray dryer of type B-290 (BÜCHI GmbH) with B-295 inert loop and B-296 dehumidifier (BÜCHI GmbH) (nozzle tip 0.7 mm; nozzle cap 1.5 mm; nozzle temperature 100° C.; $N_2$ gas flow ~30; aspirator 100%; pump 20%). 26.9 g of a brown-black powder were obtained (66% yield).

25.5 g of the resultant precomposite were placed into a fused silica boat (QCS GmbH) and carbonized in a three-zone tube furnace (TFZ 12/65/550/E301; Carbolite GmbH), using cascade regulation, including a type N probe element with argon/$H_2$ as inert gas: initially heating rate 10° C./min, temperature 300° C., hold time 90 min, Ar/$H_2$ flow rate 200 ml/min; then directly continuing with heating rate 10° C./min, temperature 1000° C., hold time 3 h, Ar/$H_2$ flow rate 200 ml/min. After cooling, 3.03 g of a black powder were obtained (yield 12%).

Figure 12:
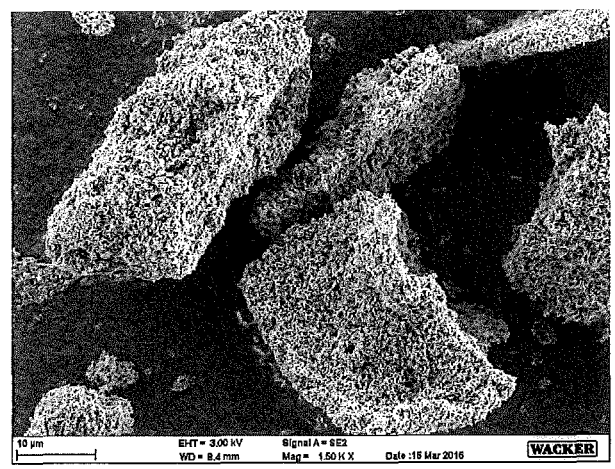
FIG. 12 is an SEM image of aggregated Si/C composite particles of Comparative Example 7 employing an oxygen-containing polymer.

The SEM image (1500 times magnification) of the product in FIG. 12 shows aggregated, microscale Si/C composite particles which in the interior contain conductive carbon black particles and nano-Si particles.

Elemental composition: Si 26.8 wt %; C 57.8 wt %; O 12.9 wt %; N 0.69 wt %.

The Si/C composite particles therefore have a significantly increased oxygen content in comparison to the use of an oxygen-free polymer (example 5).

Particle size distribution: bimodal; $D_{10}$: 8.20 µm, $D_{50}$: 62.9 µm, $D_\pi$: 108.9 µm; $(D_{90}-D_{10})/D_{50}=1.60$.

2.00 g of the Si/C composite particles were dispersed in 15.8 g of a 1.4 wt % solution of sodium carboxymethylcellulose (Daicel, grade 1380) in water by means of a dissolver at a circulation speed of 2.6 m/s for 5 min and of 13 m/s for 30 min with cooling at 20° C. After degassing, the dispersion was applied using a film-drawing frame with a 0.22 mm slot height (Erichsen, model 360) onto a copper foil (Schlenk Metallfolien, SE-Cu58) with a thickness of 0.030 mm. The electrode coating thus produced was subsequently dried for 120 minutes at 80° C. and an air pressure of 1 bar. The mean weight of the dry electrode coating per unit surface area was 1.60 mg/cm².

The electrochemical determination of the initial coulombic efficiency was carried out on a half-cell without reference. The electrode coating was used as the working electrode, and lithium foil (Rockwood Lithium, thickness 0.5 mm) was used as the counterelectrode. A glass fiber microfilter (GF Type D, Whatman) impregnated with 120 µl of electrolyte acted as the separator. The electrolyte used consisted of a 1-molar solution of lithium hexafluorophosphate in a 3:7 (v/v) mixture of ethylene carbonate and diethyl carbonate to which 2 wt % of vinylene carbonate had been added. The cell was constructed in a glovebox (<1 ppm $H_2O$, $O_2$); the water content in the dry mass of all the components used was below 20 ppm.

The electrochemical measurement was carried out at 20° C. The charging or lithiation of the electrode took place by the cc/cv method (constant current/constant voltage) with a constant current of 27 mA/g (corresponding to C/25) and, after attainment of the voltage limit of 5 mV, at constant voltage until the current dropped below 20 mA/g. The cell was discharged by the cc method (constant current) with a constant current of 27 mA/g (corresponding to C/25) until the voltage limit of 1.5 V was attained. The specific current selected was based on the weight of the coating.

The initial coulombic efficiency of the Si/C composite particles was 79.7±0.1% (mean value from measurement in triplicate) for example 7 (comparative), and is therefore significantly lower than in example 5.

The invention claimed is:

1. Si/C composite particles, prepared by:
spray drying a mixture comprising elemental silicon particles, one or more polymers, one or more carbon additives, and one or more dispersing liquids, wherein the one or more polymers are exclusively one or more oxygen-free polymers, selected from the group consisting of polyacrylonitrile, polyolefins, polyvinyl halides, polyvinylaromatics, polyaromatics, and polyaromatic hydrocarbons, and wherein the one or more carbon additives are selected from the group consisting of carbon black, activated carbon, amorphous carbon, hard carbon, carbon nanotubes, fullerenes, and graphene,
wherein the silicon particles and the one or more carbon additives in precomposite particles are enveloped entirely or partly by the one or more oxygen-free polymers, resulting in a surface of the precomposite particles formed entirely or partly by the one or more oxygen-free polymers,
wherein the elemental silicon particles have a volume-weighted particle size distribution with a median diameter $d_{50}$ of from 100 nm to 50 µm, to produce the precomposite particles, and thermally treating the precomposite particles to form the Si/C composite particles,
wherein 20% or more of a total number of the silicon particles are located within pores in the Si/C composite particles.

2. The Si/C composite particles of claim 1, wherein the one or more carbon additives are selected from the group consisting of conductive carbon black and activated carbon.

3. The Si/C composite particles of claim 1, wherein the one or more polymers are dissolved in organic solvent.

4. The Si/C composite particles of claim 1, wherein the silicon particles and the one or more carbon additives are embedded entirely or partly in carbon, and a surface of the Si/C composite particles is entirely or partly of carbon.

5. The Si/C composite particles of claim 1, wherein the Si/C composite particles have a sphericity of $0.3 \le \psi \le 1$.

6. The Si/C composite particles of claim 1, wherein the Si/C composite particles have a volume-weighted particle size distribution with diameter percentiles $d_{50}$ of 1 µm to 100 µm.

7. The Si/C composite particles of claim 1, wherein the Si/C composite particles have a breadth $(d_{90}-d_{10})/d_{50}$ of a volume-weighted particle size distribution of 1.5.

8. An electrode material for lithium-ion batteries, comprising Si/C composite particles of claim 1.

9. The Si/C composite particles of claim 1, containing 20 to 40 wt. % elemental silicon and 80 to 60 wt. % carbon.

10. The Si/C precomposite particles of claim 1, wherein the oxygen-free polymer is polyaniline, polystyrene, or a mixture thereof.

11. The Si/C composite particles of claim 1, wherein 50 percent or more of the total number of silicon particles in the composite particles are located within pores in the Si/C composite particles.

* * * * *

UNITED STATES PATENT AND TRADEMARK OFFICE
CERTIFICATE OF CORRECTION

PATENT NO. : 11,145,849 B2
APPLICATION NO. : 16/081239
DATED : October 12, 2021
INVENTOR(S) : Dennis Troegel et al.

Page 1 of 1

It is certified that error appears in the above-identified patent and that said Letters Patent is hereby corrected as shown below:

In the Claims

Column 18, Lines 50-51 Claim 7:
After "of a volume-weighted particle size distribution of"
Insert -- $\leq$ --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*